Figure 1:
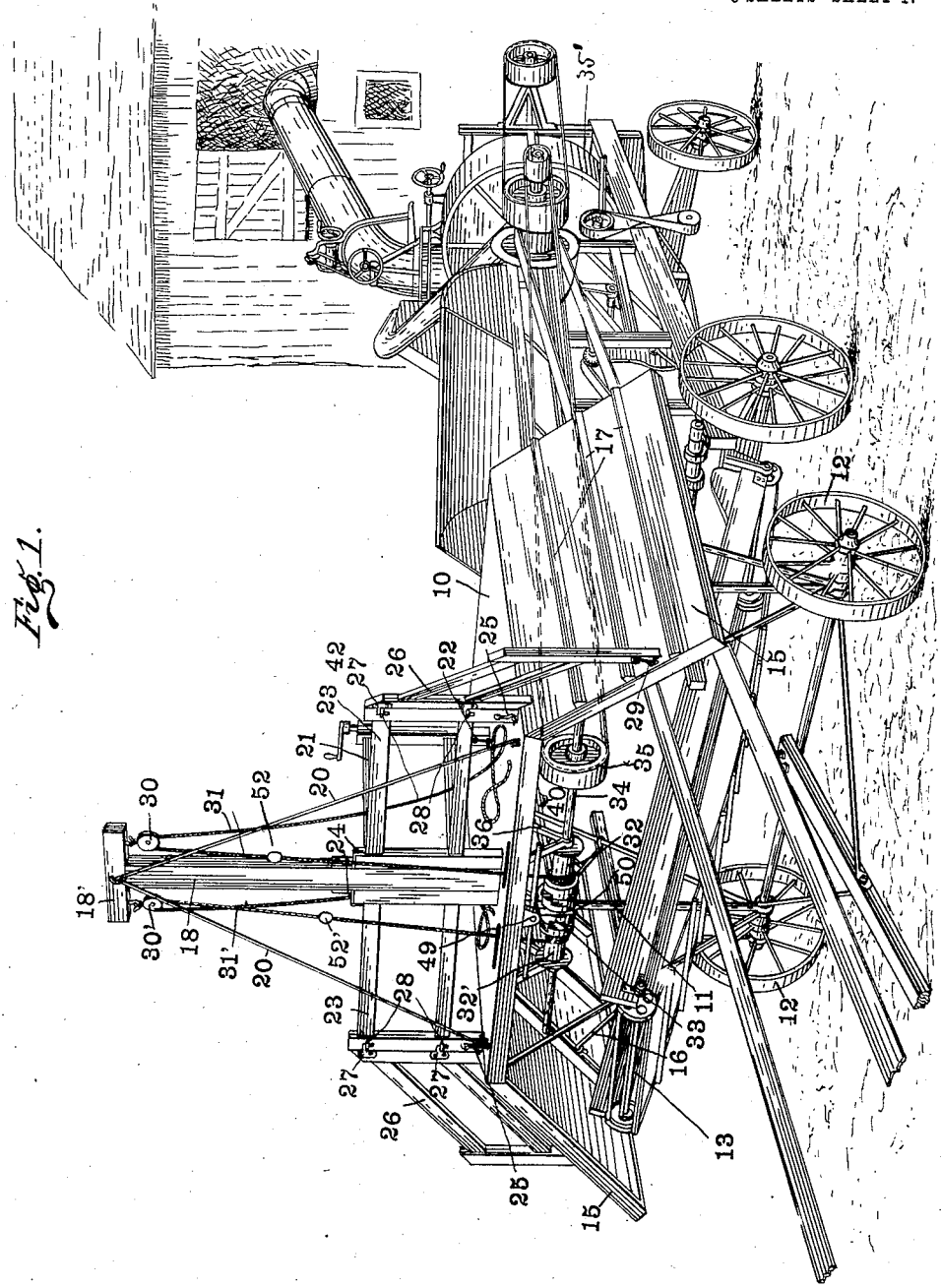

No. 893,387. PATENTED JULY 14, 1908.
J. B. SCHUMAN.
FEEDING PLATFORM FOR SHREDDERS.
APPLICATION FILED SEPT. 26, 1902.

3 SHEETS—SHEET 1.

Witnesses
Chas N. Leonard.
Frank A. Fahle

Inventor
James B. Schuman
By
Bradford & Hood
Attorneys

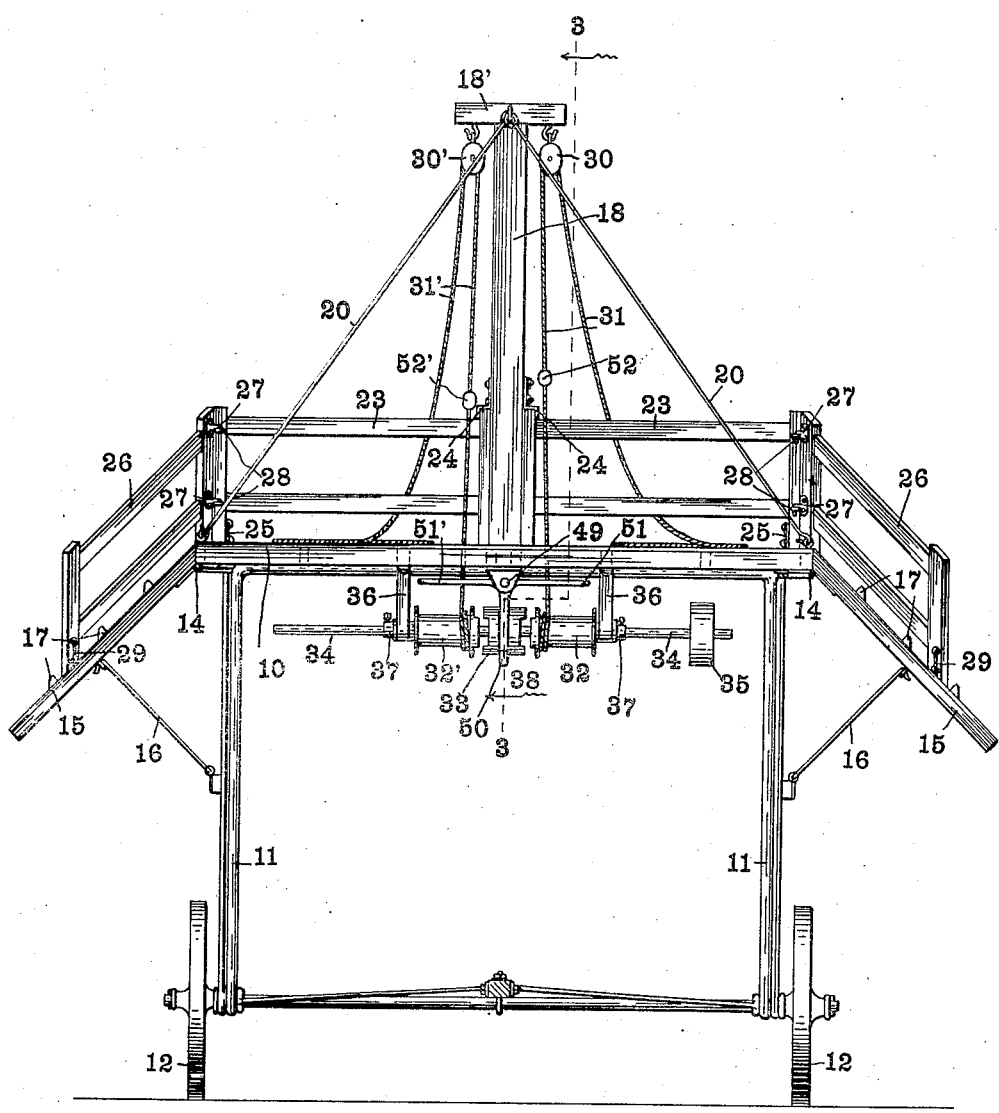

No. 893,387.
PATENTED JULY 14, 1908.
J. B. SCHUMAN.
FEEDING PLATFORM FOR SHREDDERS.
APPLICATION FILED SEPT. 26, 1902.
3 SHEETS—SHEET 3.
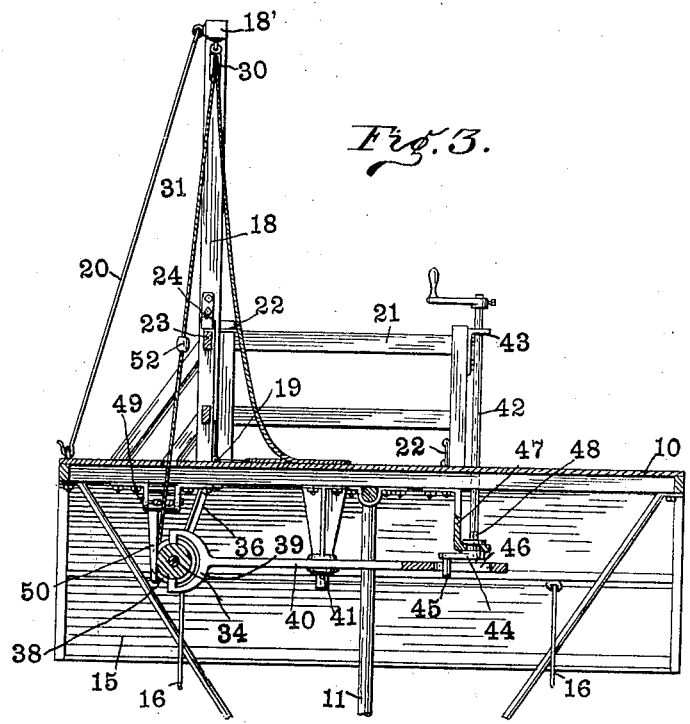
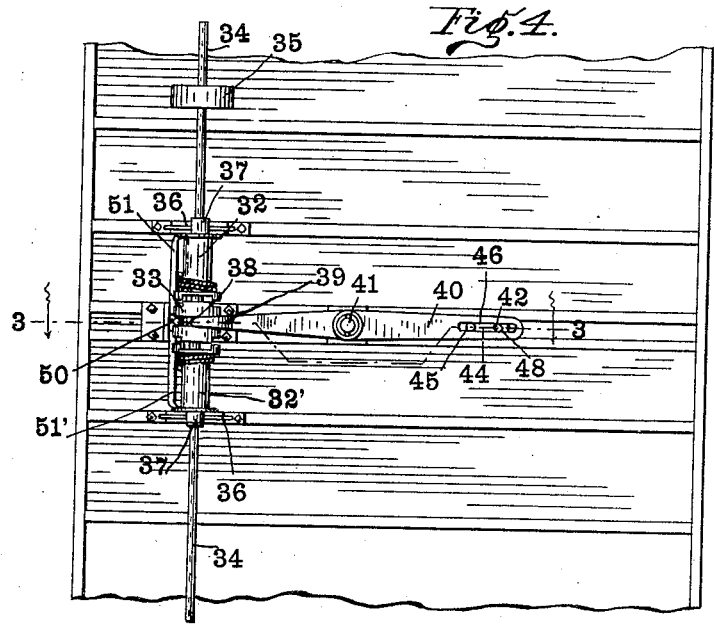
Witnesses
Chas N. Leonard.
Frank A. Fahle
Inventor
James B. Schuman
By
Bradford & Hood
Attorneys

UNITED STATES PATENT OFFICE.

JAMES B. SCHUMAN, OF COLUMBIA CITY, INDIANA, ASSIGNOR TO A COPARTNERSHIP COMPOSED OF JAMES B. SCHUMAN AND JOSEPH K. SHARPE, JR., OF INDIANAPOLIS, INDIANA, AND THEOPHILUS KING, OF QUINCY, MASSACHUSETTS.

FEEDING-PLATFORM FOR SHREDDERS.

No. 893,387.     Specification of Letters Patent.     Patented July 14, 1908.

Application filed September 26, 1902. Serial No. 124,941.

*To all whom it may concern:*

Be it known that I, JAMES B. SCHUMAN, a citizen of the United States, residing at Columbia City, in the county of Whitley and State of Indiana, have invented certain new and useful Improvements in Feeding-Platforms for Shredders, of which the following is a specification.

It has heretofore been customary in the feeding of corn stalks to shredders, for the stalks to be deposited horizontally on tables adjacent the feeding end of the shredder, from which tables they are lifted by the feeding operator, and inserted, butt end first, into the machine. This operation necessitates the removal of a few stalks at a time from the wagon by which they are brought from the field, this operation being tedious and requiring the labor of several men.

The object of my invention is to provide a feeding platform which may be separately mounted on running gear, as shown in the drawings, or may be permanently attached to the shredder, which platform shall carry or have adjacent thereto lifting mechanism readily under the control of the feeding operator by means of which entire shocks of corn may be lifted bodily from a shock loader, such for instance as that shown in my pending application No. 120,097 and placed in a standing position upon said feeder platform in such manner that the feeding operator may thereafter take a few stalks at a time from the standing shock and throw the same butt-end downward and forward into the shredder, said mechanism being preferably so constructed that it may be readily folded or transposed into convenient transporting position.

The accompanying drawings illustrate my invention when embodied in a separable mechanism detachably secured to a shredder, Figure 1 being a perspective view of my improved mechanism in operating position adjacent a shredder; Fig. 2 is a front elevation; Fig. 3 a section on line 3—3 of Figs. 2 and 4; and Fig. 4 a bottom plan of the hoisting mechanism.

In the drawings, 10 indicates a feeding platform adapted to be supported adjacent the feeding end of a shredder, and at such height from the ground as may be desired in connection with the particular shredder. In the drawings I have shown said platform as supported by a suitable framework 11 carried by supporting ground wheels 12, the framework 11 being of such height and arrangement that the shucked corn elevator 13, found in many types of shredders may project from under the platform. Hinged to each side of platform 10 at 14 is an inclined leaf or supplemental platform 15, each platform being supported in operative position by any suitable means, such for instance as suitable braces 16. The supplemental platforms 15 serve as a connection between platform 10 and the platform of any wagon upon which the shocks may be brought from the field, and in order to facilitate the use of this incline by the operator suitable cleats 17 are secured to the upper faces thereof. Erected from platform 10 is a post or derrick arm 18 which may be secured to the platform in any suitable manner, such for instance as by a hinge 19. When secured by a hinge the post 18 may be suitably braced by detachable braces 20. Extending forward from post 18 is a medial fence 21. Fence 21 may be detachably secured in position by means of catches 22. Extending from each side of post 18, say at right angles to fence 21, are fence sections 23 which are secured in position, preferably detachably, by means of brackets 24 and hooks 25, or other suitable means, each of said fence sections extending substantially to the edge of platform 10. Secured to the outer end of each of the fence sections 23 is a guard section 26, one end of which may be detachably secured to the adjacent fence section 23 by means of fingers 27 and eyes 28, the other end of which will be connected to the adjacent supplemental platform 15 by a hook and eye or other detachable mechanism 29.

Mast 18 carries at its upper end a cross-arm 18' which supports a pair of snatch-blocks 30 and 30' over which are brought cables 31 and 31' respectively, the lower ends of which are carried to winding drums 32 and 32', respectively, which are provided on their adjacent ends with suitable clutch members adapted to be engaged by a clutch member 33. The winding drums 32 and 32' and the clutch-member 33 are suitably supported upon a transverse shaft 34 to which is adjustably secured a driving pulley 35 so that said pulley may be shifted on the shaft if desired to aline with any desired driving pulley on the shredder and connected thereto by a suitable bolt 35'. Shaft 34 is mounted in suitable bearings formed in suitable brackets 36 supported by the platform 10, and may be held in position by any suitable means such as collars 37 adjustably secured to the shaft so that the position of pulley 35 may be determined if desired by shifting shaft 34 longitudinally in the bearings 36. For the purpose of operating the winding drums, clutch 33 is provided with a usual peripheral groove 38 which receives a yoke 39 carried from a shifting lever 40 pivoted at 41 to the platform 10. Any suitable means for operating the shifting lever may be provided, as for instance a shaft 42 supported vertically in a bracket 43 carried at the forward end of the medial fence 21. Shaft 42 is provided at its lower end with an arm 44 provided with a pin 45 projecting into a slot 46 formed in the shifting lever 40. If desired, the arm 44 may be revolubly supported in a bracket 47 as shown, and the lower end of shaft 42 squared as at 48 and projected into the axis of arm 44, so that shaft 42 may be readily withdrawn in order to facilitate the detachability of the fence sections and the ready dismantling of the upper works of the device for shipment. In order to automatically throw the clutch-member 33 out of engagement with either of the drums when a sufficient amount of cable has been wound up, I pivot at 49 a three arm shifting lever consisting of arm 50 which extends into slot 38 of clutch-member 33 and a pair of oppositely-extending arms 51 and 51' each provided with a slot through which the corresponding cables 31 or 31' may pass. The cables 31 and 31' are provided with blocks 52 and 52', respectively, which, when brought into engagement with the corresponding arm 51 or 51', will serve to shift finger 50 so as to throw clutch-member 33 out of engagement with the corresponding winding drum.

As previously stated, platform 10 may if desired be permanently secured to the shredder and form a part thereof, but if constructed as shown, as a separate vehicle, it will be drawn to a position adjacent the feeding end of the shredder, as shown in Fig. 1, and this separate vehicle will thus serve to maintain the feeding platform in operative position relative to the shredder. Upon the arrival of a shock loader such as that shown in my pending application the feeding operator will grasp one of the lifting cables and walk down the adjacent supplemental platform 15 to the wagon on which the shock stands, and after securing the cable to said shock, returns to platform 10 where, by operating shaft 42, he may throw the clutch-member 33 into engagement with the proper winding drum and cause said winding drum to draw upon the cable and lift the shock bodily, dragging the same up the incline 15 onto platform 10 into the crotch between the medial fence 21 and the adjacent fence 23, guard 26 serving to guide the shock in position. By the time the shock has been lifted to this position the corresponding block on the cable will have engaged the shifting arm so as to throw clutch-member 33 out of driving connection. The shock then stands in a position where the operator standing at the forward end of the platform 10 may readily grasp as many stalks as he may desire, and project the same, butt ends forward and downward, into the shredder, the position of the operator, the shock and the receiving end of the shredder being such that this operation can be accomplished very readily and with a minimum amount of labor and with much greater speed than would be possible in the old way. In transporting the device from place to place the supplemental platform 15 may be dropped down alongside the frame 11, and the mast, together with the several fence sections, readily disconnected and laid upon the platform.

I claim as my invention:

1. A device for handling a stalk crop comprising a platform, means for supporting said platform in manual feeding relation to a crop-treating machine, lifting mechanism to lift a mass of stalks to the platform, and means arranged in conjunction with the platform for supporting a mass of stalks in substantially upright position on the platform.

2. A device for handling a stalk crop comprising a platform, means for supporting said platform in manual feeding position adjacent the receiving end of a machine for treating said crop, and means arranged in conjunction with said platform for supporting a mass of stalks in substantially upright position on the platform.

3. A device for handling a stalk crop comprising a receiving platform, a central longitudinal partition rising therefrom, wing partitions extending from one end of said central partition, a hoisting mechanism supported by the platform in position to lift a bundle of stalks into the crotches between the central and wing partitions.

4. A device for handling a stalk crop comprising a receiving platform, a central longitudinal partition rising therefrom, wing partitions extending from one end of said central partition, a standard rising from said platform and carrying supports for hoisting cables, a pair of hoisting cables, a pair of hoisting drums engaging said cables, a shaft supporting said drums, intermediate clutching means between the shaft and drums, and means for controlling said clutching means.

5. A device for handling a stalk crop comprising a receiving platform, a central longitudinal partition rising therefrom, wing partitions extending from one end of said central partition, a standard rising from said platform and carrying supports for hoisting cables, a pair of hoisting cables, a pair of hoisting drums engaging said cables, a shaft supporting said drums, a clutch carried by the shaft and adapted to engage the drums, a lever engaging said clutch, and an operating shaft engaging the lever and extending above the platform.

6. A device for handling a stalk crop comprising a receiving platform, means for supporting said platform in manual feeding position adjacent the receiving end of a stalk-crop treating machine hoisting mechanism supported upon the platform in position to lift a mass of stalks upright to the platform, means carried by the platform for partially embracing a mass of stalks and supporting the same in substantially upright position thereon while at the same time leaving a clear way for feeding said stalks from the forward end of the platform, and driving means for the hoisting mechanism.

7. A device for handling a stalk crop comprising a receiving platform, means for supporting said platform in manual feeding position adjacent the receiving end of a stalk-crop treating machine, hoisting mechanism supported upon the platform in position to lift a mass of stalks upright to the platform, and means carried by the platform for only partially embracing a shock and supporting the same in substantially upright position.

8. A device for handling a stalk crop comprising a receiving platform, in manual feeding position means for supporting said platform adjacent the receiving end of a stalk-crop treating machine, hoisting mechanism supported upon the platform in position to lift a mass of stalks upright to the platform, means carried by the platform for only partially embracing a shock and supporting the same in substantially upright position, and driving means for the hoisting mechanism arranged to be connected to and driven by a stalk-crop treating machine.

9. A device for handling a stalk crop comprising a receiving platform, means for supporting said platform adjacent the receiving end of a stalk-crop treating machine, and a pair of divergent fences supported above said platform to form a crotch within which a mass of stalks may be supported in a substantially upright position, said crotch offering no obstruction to the delivery of the stalks from the open forward end thereof.

10. A device for handling a stalk crop comprising a receiving platform, means for supporting said platform in feeding position adjacent the receiving end of a stalk-crop treating machine, a pair of divergent fences supported above said platform to form a crotch within which a mass of stalks may be supported in a substantially upright position, and lifting mechanism to lift a mass of stalks upright to the platform.

11. A device for handling a stalk crop comprising a receiving platform, means for supporting said platform adjacent the receiving end of a stalk-crop treating machine, a pair of divergent fences supported above said platform to form a crotch within which a mass of stalks may be supported in a substantially upright position, an incline leading upward to the edge of the platform, and lifting mechanism for lifting a mass of stalks upright up said incline to the platform.

12. A device for handling a stalk-crop comprising a receiving platform, means for supporting said platform in feeding position adjacent the receiving end of a stalk-crop treating machine, a mast carried by said platform, lifting mechanism carried by said mast, and a pair of divergent fences supported above the platform in position to support a mass of stalks upon the platform in substantially upright position.

13. A device for handling a stalk-crop comprising a receiving platform, means for supporting said platform in feeding position adjacent the receiving end of a stalk-crop treating machine, a mast carried by said platform, lifting mechanism carried by the mast, an incline leading upwardly to the edge of the platform, and a pair of divergent fences supported above the platform in position to support a mass of stalks on the platform in substantially upright position.

14. The combination, with a stalk - crop treating machine, of a platform arranged in manual feeding position adjacent the receiving end of said machine, and means arranged in conjunction with said platform for engaging and supporting a mass of stalks substantially upright upon said platform, whereby substantial upright stalks may be fed manually from said platform into the crop treating machine.

15. The combination with a stalk crop treating machine, of a receiving platform arranged in manual feeding position adjacent the receiving end of said machine, lifting mechanism for lifting a mass of stalks upright to said platform, and means carried by the platform for partially embracing a mass of stalks at a point above the platform to support said stalks substantially in an upright position on the platform, whereby substantial upright stalks may be fed manually from said platform into the crop treating machine.

16. The combination, with a stalk-crop treating machine, of a device for handling said stalk-crop, comprising a receiving-platform, a central partition rising therefrom, wing partitions extending from one end of said central partition, the hoisting mechanism supported by the platform in position to lift a bundle of stalks into the crotches between the central and wing partitions.

17. The combination, with a stalk-crop treating machine, of a device for handling said stalk-crop, comprising a receiving platform, a central partition rising therefrom, wing partitions extending from one end of said central partition, a standard rising from said platform and carrying supports for hoisting cables, a pair of hoisting cables, a pair of hoisting drums engaging said cables, a shaft supporting said drums, intermediate clutching means between the shaft and drums, and means for controlling said clutching means.

18. The combination, with a stalk-crop treating machine, of a device for handling said stalk-crop comprising a receiving platform, a central partition rising therefrom, wing partitions extending from one end of said central partition, a standard rising from said platform and carrying supports for hoisting cables, a pair of hoisting cables, a pair of hoisting drums engaging said cables, a shaft supporting said drums, a clutch carried by the shaft and adapted to engage the drums, a lever engaging said clutch, and an operating shaft engaging the lever and extending above the platform.

19. The combination, with a stalk-crop treating machine, of a device for handling said stalk-crop comprising a receiving platform arranged in manual feeding position adjacent the receiving end of the treating machine, hoisting mechanism supported upon the platform in position to lift a mass of stalks upright to the platform, means carried by the platform for partially embracing a mass of stalks and supporting the same in substantially upright position thereon, and driving means for the hoisting mechanism.

20. The combination, with a stalk-crop treating machine, of a device for handling said stalk-crop comprising a receiving platform arranged in manual feeding position adjacent the receiving end of the treating machine, means for supporting said platform adjacent the receiving end of a stalk-crop treating machine, hoisting mechanism supported upon the platform in position to lift a mass of stalks upright to the platform, and means carried by the platform for partially embracing a shock and supporting the same in substantially upright position.

21. The combination, with a stalk-crop treating machine, of a device for handling said stalk-crop comprising a receiving platform, means for supporting said platform adjacent the receiving end of the stalk-crop treating machine, hoisting mechanism supported upon the platform in position to lift a mass of stalks upright to the platform, means carried by the platform for partially embracing a shock and supporting the same in substantially upright position, and driving means for the hoisting mechanism arranged to be connected to and driven by a stalk-crop treating machine.

22. The combination, with a stalk-crop treating machine, of a device for handling said stalk-crop comprising a receiving platform, means for supporting said platform adjacent the receiving end of the stalk-crop treating machine, and a pair of divergent fences supported above said platform to form a crotch within which a mass of stalks may be supported in a substantially upright position.

23. The combination, with a stalk-crop treating machine, of a device for handling said stalk-crop comprising a receiving platform, means for supporting said platform adjacent the receiving end of the stalk-crop treating machine, a pair of divergent fences supported above said platform to form a crotch within which a mass of stalks may be supported in a substantially upright position, and lifting mechanism to lift a mass of stalks upright to the platform.

24. The combination, with a stalk-crop treating machine, of a device for handling said stalk-crop comprising a receiving platform, means for supporting said platform adjacent the receiving end of the stalk-crop treating machine, a pair of divergent fences supported above said platform to form a crotch within which a mass of stalks may be supported in a substantially upright position, an incline leading upward to the edge of the platform, and lifting mechanism for lifting a mass of stalks upright up said incline to the platform.

25. The combination, with a stalk-crop treating machine, of a device for handling said stalk-crop comprising a receiving platform, means for supporting said platform adjacent the receiving end of the stalk-crop treating machine, a mast carried by said platform, lifting mechanism carried by said mast, and a pair of divergent fences supported above the platform in position to support a mass of stalks upon the platform in substantially upright position.

26. The combination, with a stalk-crop treating machine, of a device for handling said stalk-crop comprising a receiving platform, means for supporting said platform adjacent the receiving end of the stalk-crop treating machine, a mast carried by said platform, lifting mechanism carried by the mast, an incline leading upwardly to the edge of the platform, and a pair of divergent fences supported above the platform in position to support a mass of stalks on the platform in substantially upright position.

In witness whereof, I have hereunto set my hand and seal at Indianapolis, Indiana, this 23d day of August, A. D. one thousand nine hundred and two.

JAMES B. SCHUMAN. [L. S.]

Witnesses:
ARTHUR M. HOOD,
JAMES A. WALSH.